(12) United States Patent
Suzuki et al.

(10) Patent No.: US 8,443,929 B2
(45) Date of Patent: May 21, 2013

(54) POWER STEERING APPARATUS

(75) Inventors: Tatsuro Suzuki, Atsugi (JP); Kohtaro Shiino, Isehara (JP); Yusuke Fukuda, Atsugi (JP); Atsushi Yoshitake, Ebina (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 497 days.

(21) Appl. No.: 12/729,865

(22) Filed: Mar. 23, 2010

(65) Prior Publication Data

US 2010/0243367 A1  Sep. 30, 2010

(30) Foreign Application Priority Data

Mar. 24, 2009 (JP) ................................. 2009-072257

(51) Int. Cl.
*B62D 5/04* (2006.01)

(52) U.S. Cl.
USPC ......................................................... 180/444

(58) Field of Classification Search
USPC ........................................ 180/443, 444, 446
See application file for complete search history.

(56) References Cited

U.S. PATENT DOCUMENTS

| | | | | |
|---|---|---|---|---|
| 7,523,805 | B2* | 4/2009 | Imagaki et al. | 180/444 |
| 8,066,093 | B2* | 11/2011 | Kondo et al. | 180/444 |
| 2004/0182188 | A1 | 9/2004 | Nakamura et al. | |
| 2007/0205039 | A1* | 9/2007 | Imagaki et al. | 180/444 |
| 2007/0251758 | A1* | 11/2007 | Segawa et al. | 180/444 |
| 2009/0266640 | A1* | 10/2009 | Oshima et al. | 180/444 |
| 2010/0116582 | A1* | 5/2010 | Rho et al. | 180/444 |
| 2010/0181139 | A1* | 7/2010 | Tokura et al. | 180/444 |
| 2011/0067946 | A1* | 3/2011 | Kim | 180/444 |
| 2012/0217085 | A1* | 8/2012 | Sekikawa | 180/444 |

FOREIGN PATENT DOCUMENTS

JP    2004-203154    7/2004

* cited by examiner

*Primary Examiner* — Kevin Hurley
(74) *Attorney, Agent, or Firm* — Antonelli, Terry, Stout & Kraus, LLP.

(57) ABSTRACT

A power steering apparatus includes a worm wheel mounted on the steering shaft, a worm shaft engaged with the worm wheel, a gear housing having a wheel accommodating portion to accommodate the worm wheel and a shaft accommodating portion to accommodate the worm shaft, a bearing mounted on the worm shaft to rotatably support the worm shaft, a holder disposed in the shaft accommodating portion and having a bearing retaining portion to retain the bearing and a resilient element disposed in the shaft accommodating portion and having a resilient body portion formed with a curvature. The resilient body portion is so structured as to become deformed in such a manner as to increase or decrease in diameter when the bearing shifts in a direction that moves the worm shaft away from the worm wheel and bias the bearing in a direction that urges the worm wheel toward the worm wheel.

15 Claims, 6 Drawing Sheets

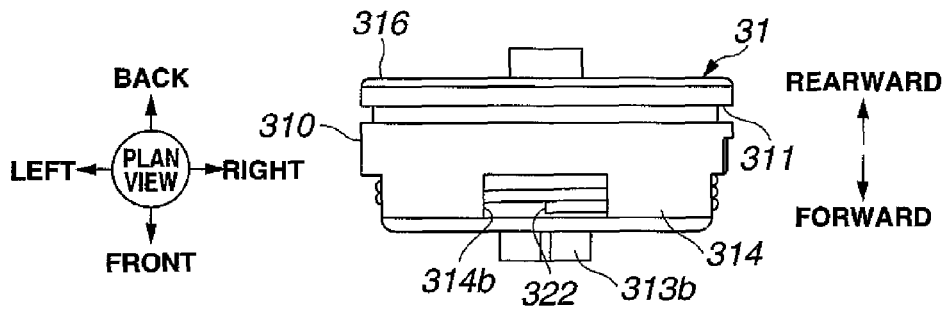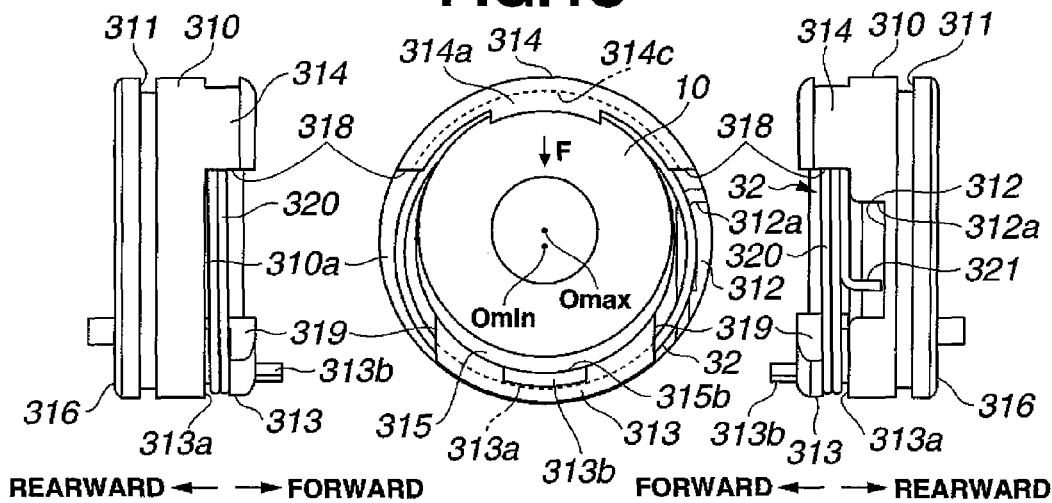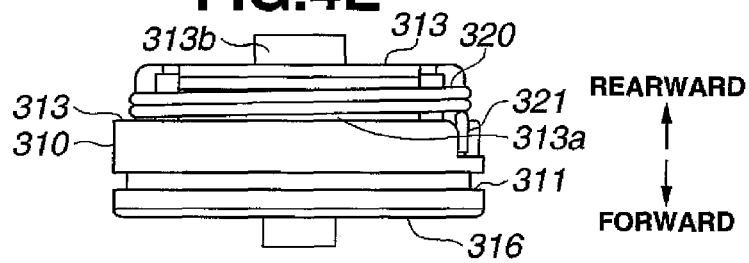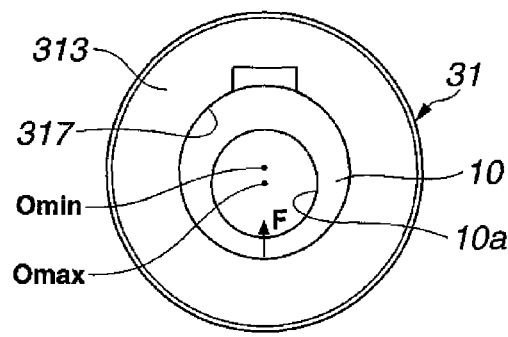

POWER STEERING APPARATUS

BACKGROUND OF THE INVENTION

The present invention relates to a power steering apparatus.

Japanese Laid-Open patent Publication No. 2004-203154 proposes a power steering apparatus, which includes a worm wheel mounted on a steering shaft, a worm shaft supported by a bearing and engaged with the worm wheel and an electric motor mounted on the worm shaft and a backlash adjusting mechanism having a resilient element disposed on the bearing to bias the bearing toward the worm wheel side and thereby adjust a backlash (clearance in gear mesh) between the worm shaft and the worm wheel for improvement of motor steering assist and reduction of driver's steering efforts.

SUMMARY OF THE INVENTION

In the above proposed power steering apparatus, a plate spring is used as the resilient element so that the resilient element has to have a large spring constant and shows a relatively large change in biasing force with even a slight displacement of the worm shaft. As a result, the backlash adjusting mechanism causes a relatively large variation in load relative to the displacement of the worm shaft so that the power steering apparatus cannot attain an improved steering feeling.

It is accordingly an object of the present invention to provide a power steering apparatus capable of adjusting a gear backlash without failing to secure improvement in steering feeling.

According to one aspect of the present invention, there is provided a power steering apparatus, comprising: a steering mechanism having a steering shaft connected to a steering wheel to steer steerable wheels in response to a steering operation of the steering wheel; a worm wheel mounted on the steering shaft; a worm shaft engaged with the worm wheel; an electric motor connected to one end of the worm shaft to apply a steering force to the steering mechanism via the worm wheel and the worm shaft; a gear housing having a wheel accommodating portion to accommodate therein the worm wheel and a shaft accommodating portion to accommodate therein the worm shaft; a bearing disposed in the shaft accommodating portion and mounted on the other end of the worm shaft to rotatably support the worm shaft; a holder disposed in the shaft accommodating portion and having a bearing retaining portion to retain therein the bearing; and a resilient element disposed in the shaft accommodating portion and having a body portion made of a resilient material and formed with a curvature and first and second end portions formed at opposite ends of the body portion, the body portion being so structured as to become deformed to a larger diameter when the bearing shifts in a direction that moves the worm shaft away from the worm wheel and bias the bearing in a direction that urges the worm wheel toward the worm wheel, the first end portion being displaceable in position relative to the second end portion when the body portion becomes deformed to the larger diameter.

According to another aspect of the present invention, there is provided a power steering apparatus, comprising: a steering mechanism having a steering shaft connected to a steering wheel to steer steerable wheels in response to a steering operation of the steering wheel; a worm wheel mounted on the steering shaft; a worm shaft engaged with the worm wheel; an electric motor connected to one end of the worm shaft to apply a steering force to the steering mechanism via the worm wheel and the worm shaft; a gear housing having a wheel accommodating portion to accommodate therein the worm wheel and a shaft accommodating portion to accommodate therein the worm shaft; a bearing disposed in the shaft accommodating portion and mounted on the other end of the worm shaft to rotatably support the worm shaft; a holder disposed in the shaft accommodating portion and having a bearing retaining portion to retain therein the bearing; and a resilient element disposed in the shaft accommodating portion and having a body portion made of a resilient material and formed with a curvature and first and second end portions located at opposite ends of the body portion, the body portion being located at a position axially overlapping the bearing and so structured as to become deformed in such a manner as to increase or decrease in diameter when the bearing shifts in a direction that moves the worm shaft away from the worm wheel and bias the bearing in a direction that urges the worm wheel toward the worm wheel.

The other objects and features of the present invention will also become understood from the following description.

BRIEF DESCRIPTION OF THE DRAWINGS

FIGS. 4A to 4F are a back view, a left side view, a top view, a right side view, a front elevation view and a bottom elevation view of a holder and a resilient element of the backlash adjusting mechanism according to the first embodiment of the present invention, respectively.

DESCRIPTION OF THE EMBODIMENTS

Figure 1:
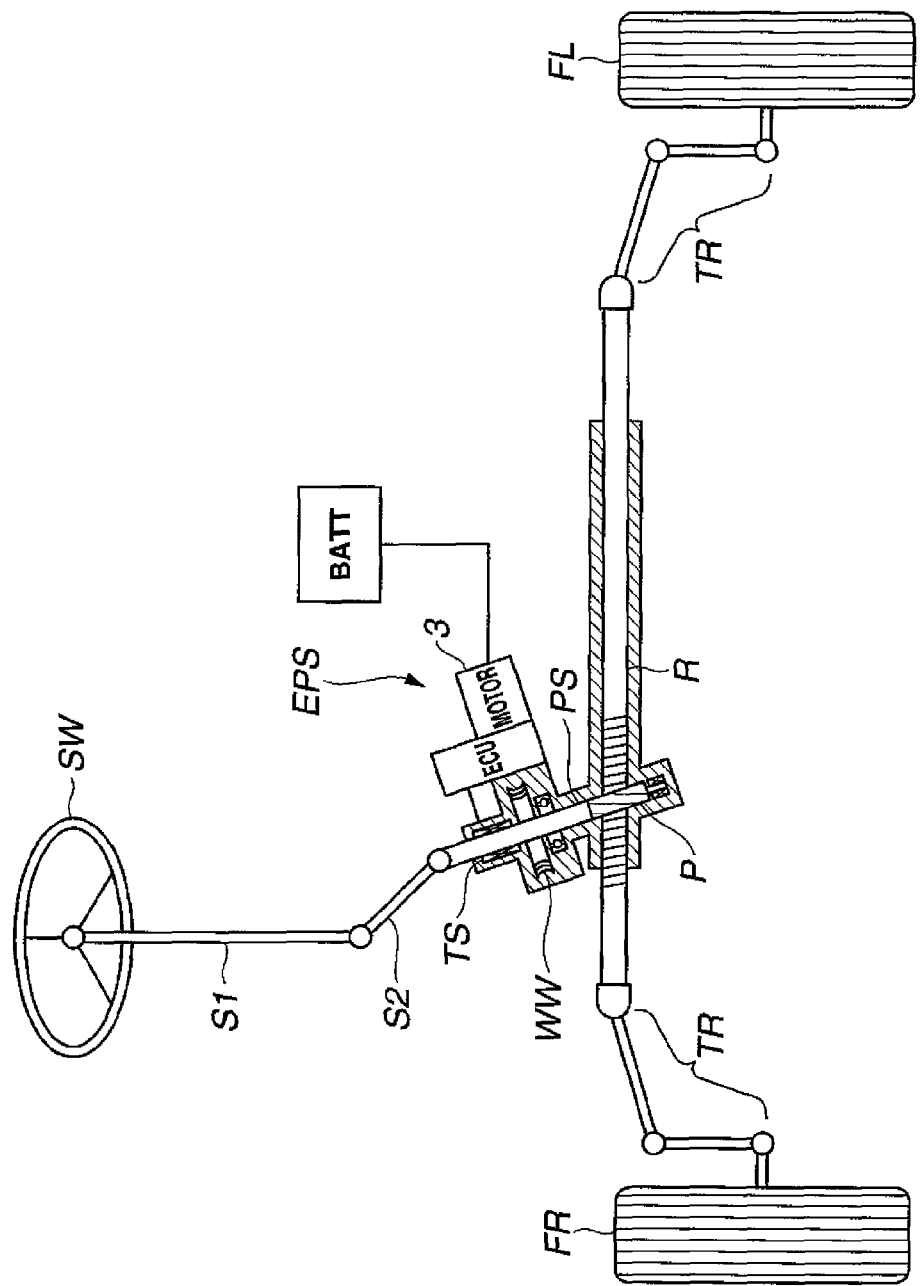
FIG. 1 is a schematic view of a power steering apparatus for an automotive vehicle according to a first embodiment of the present invention.

The present invention will be described in detail below by way of the following first to third embodiments, in which like parts and portions are designated by like reference numerals to avoid repeated explanations thereof.

First Embodiment

Figure 2:
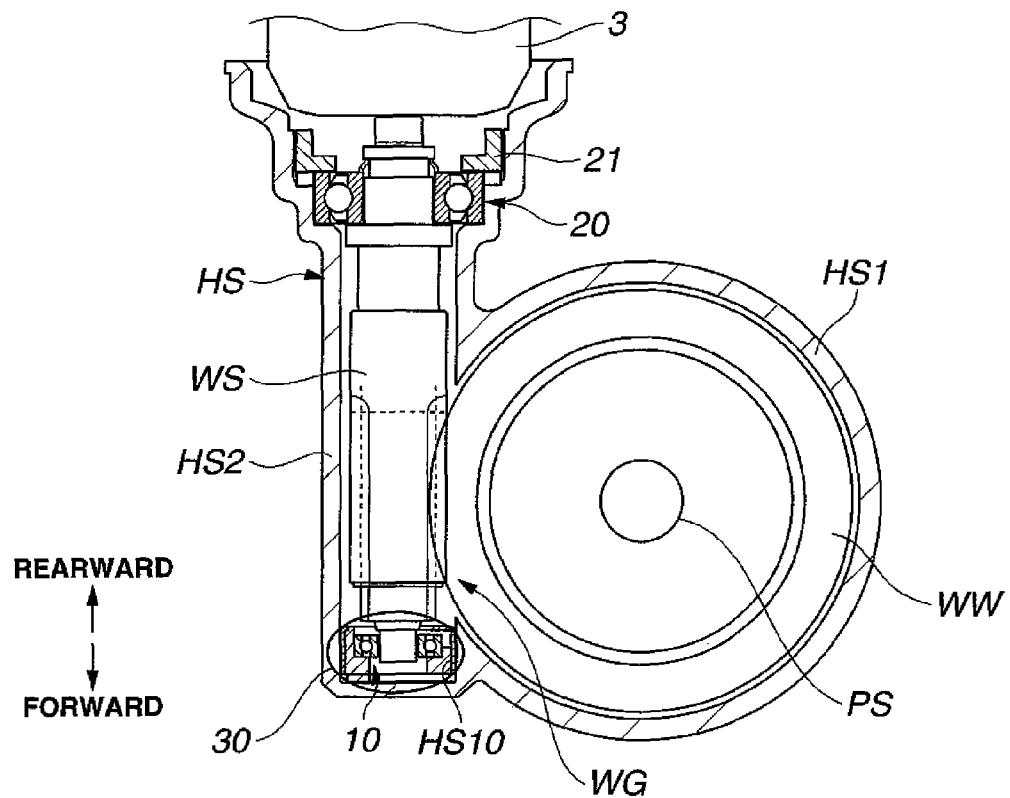
FIG. 2 is a section view of a steering assist mechanism of the power steering apparatus according to the first embodiment of the present invention.

As shown in FIGS. 1 and 2, a power steering apparatus for an automotive vehicle according to the first embodiment of the present invention is provided with a steering mechanism, a power steering unit EPS (as a steering assist mechanism) and a backlash adjusting mechanism 30.

The steering mechanism includes a first steering shaft S1 connected to a steering wheel SW, a second steering shaft S2 connected to the first steering shaft S1 via a universal joint, a pinion shaft PS (as a third steering shaft) having one end connected to the second steering shaft S2 via a universal joint and the other end formed with a pinion P and a rack shaft R having a rack engaged with the pinion P and opposite ends connected to steerable road wheels FR and FL of the vehicle via link mechanisms TR. When the steering wheel SW is turned by a vehicle driver, a steering torque is transmitted from the steering wheel SW through the steering shafts S1 and S2 to the pinion shaft PS. The rack shaft R is then moved laterally with rotation of the pinion shaft PS so that the vehicle road wheels FR and FL are steered in response to the steering operation of the steering wheel SW.

The power steering unit EPS is disposed on the pinion shaft PS.

As shown in FIGS. 1 and 2, the power steering unit EPS includes a torque sensor TS mounted on the pinion shaft PS to detect a steering torque applied by the vehicle driver to the steering wheel SW, a worm gear WG (as a reduction gear) having a worm wheel WW made of a resin material and mounted on the pinion shaft PS and a worm shaft WS made of a metal material and engaged with the worm wheel WW, an electric motor 3 connected to one end of the worm shaft WS to apply a steering assist torque to the pinion shaft PS through the worm gear WG and to transmit a torque and rotation from the pinion shaft 3 to the electric motor 3 through the worm gear WG, a controller ECU arranged between the electric motor 3 and the torque sensor TS to control an operation of the electric motor 3 based on a detection result of the torque sensor TS and a battery BATT as a power source of the electric motor 3.

The power steering unit EPS also includes a gear housing HS and first and second bearings 10 and 20 as shown in FIG. 2. The gear housing HS has a wheel accommodating portion HS1 to accommodate therein the worm wheel WW and a shaft accommodating portion HS2 to accommodate therein the worm shaft WS. A cylindrical recess HS10 is formed at an end of the shaft accommodating portion HS2 opposite from the electric motor 3. The inner circumferential surface of the recess HS10 has a simple cylindrical shape (i.e. a substantially circular cross-sectional profile) with no step or steps on thereon. There is no need to form the recess HS into a such complicated shape as in the earlier technology. The first and second bearings 10 and 20 are mounted on the opposite ends of the worm shaft WS, respectively, to rotatably support the worm shaft WS. In the first embodiment, each of the first and second bearings 10 and 20 has a radial ball bearing structure that receives a radial load from the worm shaft WS. More specifically, the first bearing 10 has an inner ring secured to the one end of the worm shaft WS, an outer ring arranged around the inner ring and a plurality of balls (as rolling elements) arranged between the inner and outer rings. The second bearing 20 has an inner ring arranged on a stepped portion of the other end of the worm shaft WS, an outer ring arranged around the inner ring and secured by a lock nut 21 to the gear housing HS and a plurality of balls (as rolling elements) arranged between the inner and outer rings. The first and second bearings 10 and 20 thus allows rotation of the worm shaft WS but prevents axial movement of the worm shaft WS.

The backlash adjusting mechanism 30 is disposed between the first bearing 10 and the gear housing HS.

Figure 3:
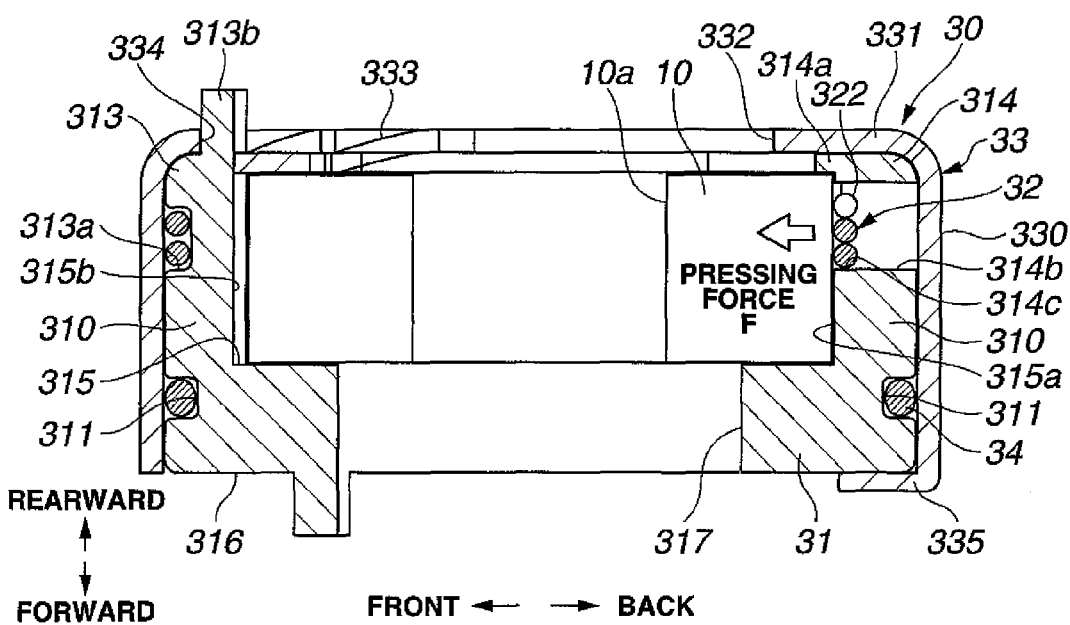
FIG. 3 is a section view of a backlash adjusting mechanism of the power steering apparatus according to the first embodiment of the present invention.

As shown in FIG. 3, the backlash adjusting mechanism 30 includes a holder 31 to hold therein the first bearing 10 slidably, a resilient element 32 having one part engaged in the holder 31 and the other part held in contact with the first bearing 10 to bias the first bearing 10 (i.e. apply a pressing force F to the first bearing 10) in one direction that urges the one end of the worm shaft WS toward the worm wheel WW all the time and a metal cap 33 put on an outer circumference of the holder 31 and press fitted in the cylindrical recess HS10 of the gear housing HS to cover therewith the first bearing 10, the holder 31 and the resilient element 32. Namely, the backlash adjusting mechanism 30 is thus press-fitted in the cylindrical recess HS10 of the gear housing HS via the metal cap 33.

It is herein noted, in the following description, that: the terms "forward" are "rearward" are used with respect to the direction of insertion of the worm shaft WS in the shaft accommodating portion HS2 (i.e. the direction of insertion of the backlash adjusting mechanism 30 in the recess HS10); and the terms "front", "back", "left" and "right" are used as viewed from the worm wheel side and as viewed in the plan view of FIG. 4C. In such definitions, the forward side, the rearward side, the front side and the back side of the backlash adjusting mechanism 30 are opposite from the electric motor 3, close to the electric motor 3, close to the worm wheel WW and opposite from the worm wheel WW, respectively, with respect to the direction of an axis of the worm shaft WS. Further, the terms "top" and "bottom" are occasionally used to indicate sides of the backlash adjusting mechanism 30 that are the same to the forward and rearward sides, respectively. These terms are however used only for purposes of illustration and are not intended to limit the present invention to any particular direction or orientation.

The holder 31 is formed in one piece of a resin material and disposed in the recess HS10 of the shaft accommodating portion HS2 of the gear housing HS. As shown in FIGS. 3, 4A to 4F and 5, the holder 31 includes a bearing retaining portion 315 to retain therein the first bearing 10 slidably, with a part of the first bearing 10 protruding from the bearing retaining portion 315, and first and second guide portions 314 and 313 to guide the protruding part of the first bearing 10.

Figure 6:
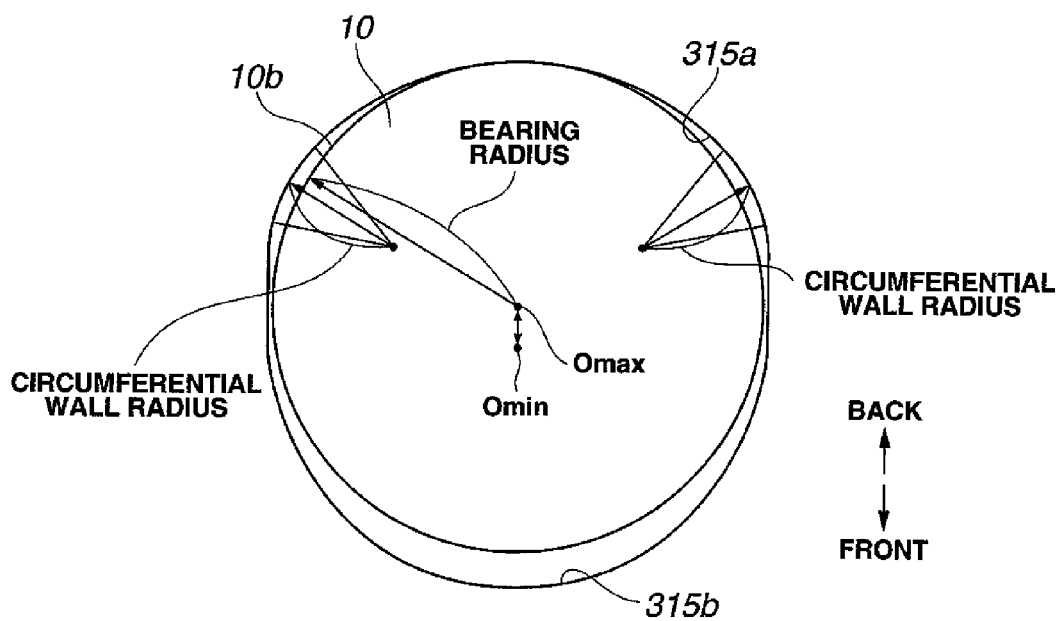
FIG. 6 is a schematic view of a bearing retaining portion of the holder of the backlash adjusting mechanism according to the first embodiment of the present invention.

The bearing retaining portion 315 is defined to have an elongated (elliptic) hole by a cylindrical circumferential wall 310 of the holder 31 so that the first bearing 10 can slide in a given radial direction of the bearing retaining portion 315 within a range of the center O of the first bearing 10 between an initial position Omin and a maximum shift position Omax as shown in FIG. 6. A back inner circumferential surface 315a of the bearing retaining portion 315 (located opposite from the worm wheel WW) has a combination of a smaller curvature radius and greater curvature radii than that of an outer circumferential surface 10b of the first bearing 10 so as to prevent the first bearing 10 from fitting in the curvature of the bearing retaining portion 315 and secure stable sliding of the first bearing 10. On the other hand, a front inner circumferential surface 315b of the bearing retaining portion 315 (located close to the worm wheel WW) has the same curvature radius as that of the outer circumferential surface 10b of the first bearing 10 as almost no load is exerted on the inner circumferential surface 315b of the bearing retaining portion 315. Alternatively, the inner circumferential surface 315b of the bearing retaining portion 315 may have a combination of different curvature radii in the same manner as the inner circumferential surface 315a.

A ring groove 311 is formed in an outer circumferential surface of the circumferential wall 310 so that an O-ring 34 is fitted in the ring groove 311 to perform a shock absorbing function between the holder 31 and the metal cap 33.

The first guide portion 314 is located on and a back rearward side of the circumferential wall 310. The first guide portion 314 has an inner circumferential surface and end faces 318 directed toward the front side. The inner circumferential surface of the first guide portion 314 is of the same shape as the inner circumferential surface 315a of the bearing retaining portion 315. A regaining groove 314 is formed in the inner circumferential surface of the first guide portion 314 so as to retain therein a part of the resilient element 32. Further, a radially inwardly extending protrusion 314a is formed on the first guide portion 314 at a rearward side of the retaining groove 314c so as to function as a stopper that prevents axial movements of the first bearing 10 and the resilient element 32 by contact of the first bearing 10 and the resilient element 32 with the protrusion 314a.

A through hole 314b is formed radially through the first guide portion 314 from the retaining groove 314c to the outer circumferential surface of the holder 31. This through hole 314b functions as a die cut hole for the formation of the retaining groove 314c during the process of molding the holder 31.

The second guide portion 313 is located on and along a front rearward side of the circumferential wall 310. The second guide portion 313 has an inner circumferential surface and end faces 319 directed toward the left and right sides, respectively. The inner circumferential surface of the second guide portion 313 is of the same shape as the bearing retaining portion 315. A retaining groove 313a is formed in an outer circumferential surface of the second guide portion 313 so as to retain therein a part of the resilient element 32. Further, an axially outwardly extending protrusion 313b is formed at a substantially center on a rearward end of the second guide portion 313 so as to function as a stopper that prevents relative rotation of the holder 31 and the metal cap 33 by contact of the metal cap 33 with the protrusion 313b.

Herein, the retaining grooves 314c and 313a are located at the same axial position facing the outer circumferential surface 10b of the part of the first bearing 10 in the state where the first bearing 10 is fixed in place in the holder 31.

A top (rearward) surface 310a of the circumferential wall 310 on which the guide portions 314 and 313 are not located (hereinafter occasionally referred to as "retaining surface") is axially aligned with the retaining grooves 314c and 313a so as to retain thereon a part of the resilient element 32.

A retaining recess 312 with a rotation restriction surface 312a is also formed in the circumferential wall 310 by cutting away a part of the circumferential wall 310 at a right side of the retaining surface 310a, so as to retain one end of the resilient element 32 movably in the retaining recess 312.

There is consequently a resilient element retaining portion defined to have a substantially annular space, by the retaining groove 313a in the outer circumferential surface of the guide portion 313, the retaining surface 310a of the circumferential wall 310, the retaining groove 314c in the inner circumferential surface of the guide portion 314, the retaining recess 312 and the rotation restriction surface 312a of the circumferential wall 310. The resilient element retaining portion is axially offset from the bearing retaining portion 315. Namely, the resilient element retaining portion and the bearing retaining portion 315 are located on rearward and forward sides of the holder 31. In the first embodiment, a thickness (radial cross-sectional dimension) of the circumferential wall 310 that defines the bearing retaining portion 315 is made larger than those of the guide portions 313 and 314 that define the resilient element retaining portion. When the first bearing 310 slides under a load from the worm shaft WS, the load is exerted on the inner circumferential surface of the circumferential wall 310 upon contact of the first bearing 310 with the inner circumferential surface of the circumferential wall 310. It is thus possible by such radial cross-sectional dimension control that the bearing retaining portion 315 can secure sufficient strength against the load from the first bearing 10.

Further, an opening 317 is formed in a bottom (forward) surface 316 of the holder 31. This opening 317 is made larger in diameter than the inner circumferential surface 10a of the first bearing 10 and smaller in diameter than the outer circumferential surface 10b of the first bearing 10 so that the forward end of the worm shaft WS, if slightly projected from the first bearing 10, can pass through the opening 317 to prevent interference between the holder 31 and the worm shaft WS.

The resilient element 32 is retained in the resilient element retaining portion of the holder 31. As shown in FIGS. 3, 4A to 4F and 5, the resilient element 32 includes a body portion 320 made of a resilient material and formed with a curvature to have a annular shape or an arc shape and first and second end portions 322 and 321 located at opposite ends of the body portion 320 such that the first end portion 322 is relative to the second end portion 321 when the body portion 320 is deformed to a larger diameter. In the first embodiment, the body portion 320 is formed into an annular coil spring by winding e.g. two turns of spring steel wire and retained in the retaining grooves 313a and 314c and on the retaining surface 310a of the holder 31 with an inner circumferential side thereof held into direct contact with the outer circumferential surface 10b of the first bearing 10. The first end portion 322 is located in the retaining groove 314c, at such a position as to be covered by the protrusion 314a, as a free end of the coil spring. Alternatively, the end portion 322 can be located in any other position so as not to be covered by the protrusion 314a. The second end portion 321 is bent in a direction parallel to the axis of the worm shaft WS and fitted movably in the retaining recess 312 so as to allow rotation of the resilient element 31 relative to the holder 31 but prevent excessive relative rotation of the resilient element 32 by contact of the second end portion 321 with the rotation restriction surface 312a.

Thus, the resilient element 32 extends on the outer circumferential side of the second guide portion 313 and on the inner circumferential side of the first guide portion 314 within the resilient element accommodating space of the holder 31 and holds the first bearing 10 resiliently between the inner circumferential surface of the body portion 320 and the inner circumferential surface 315b of the bearing retaining portion 315. In an initial position, the resilient element 32 (body portion 320) keeps the outer circumferential surface of the first bearing 10 into contact with the inner circumferential surface 315b of the bearing retaining portion 315. When a backward force is applied from the worm shaft WS to the first bearing 10, the first bearing 10 slides against the resilient force of the resilient element 32 and thereby pushes the resilient element 32 backwardly. At this time, the resilient element 32 is stretched toward the first guide portion 314 while being prevented from radial movement by the second guide portion 313. As both of the first and second end portions 322 and 321 are basically provided as the free ends of the coil spring and are displaceable relative to each other, the body portion 320 becomes deformed to a larger diameter by the backward sliding movement of the first bearing 10.

In this way, the resilient element 32 exerts its resilient biasing force on the first bearing 10 with the diameter-increasing (radially outward) deformation of the body portion 320. The spring constant of the resilient element 32 (body portion 320) can be thus set to a smaller degree through the effective use of the wire length of the resilient element 32. It is accordingly possible to limit a load variation caused by the backlash adjusting mechanism 30 with respect to the sliding movement of the first bearing 10 (i.e. the displacement of the worm shaft WS) and thereby possible to obtain improvement in steering feeling.

Figure 5:
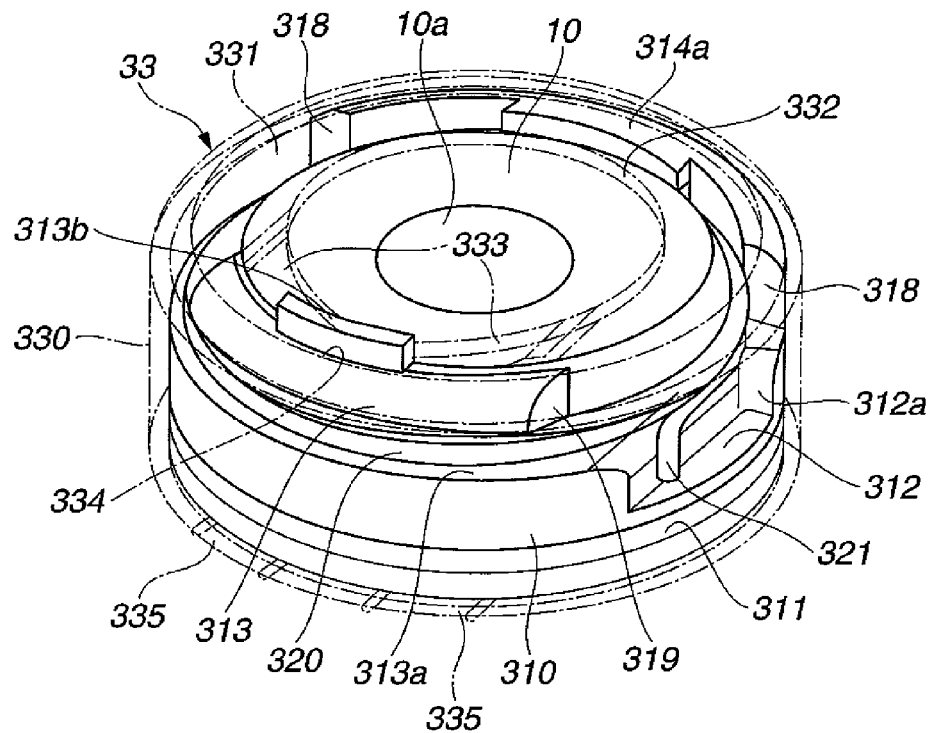
FIG. 5 is a perspective view of the backlash adjusting mechanism according to the first embodiment of the present invention.

The metal cap 33 is arranged between the holder 31 and the recess HS10 of the shaft accommodating portion HS2 of the gear housing HS. As shown in FIGS. 3 and 5, the metal cap 33 includes an annular cylindrical portion 330 and a radially inwardly extending stopper portion 331. The annular cylindrical portion 330 is formed with such a curvature that the metal cap 30 can be put on the holder 31 and press-fitted in the recess HS10. The stopper portion 331 is formed at a rearward end of the annular cylindrical portion 330 to prevent axial movement of the holder 31 by contact of the holder 31 with the stopper portion 331. A through hole 332 is made in the center of the stopper portion 331 so that the worm shaft WS passes through the through hole 332. An inner edge of the through hole 332 is cut away at a position corresponding to the second guide portion 313 to define a recess 334 through which the protrusion 313b is inserted. The metal cap 33 also includes a pair of plate spring portions 333 and a plurality of radially inwardly extending stopper portions 335. The plate spring portions 333 are formed on both sides of the recess 334, with parts thereof bent toward the forward, to not only prevent relative rotation of the holder 31 and the metal cap 33 but also urge the first bearing 10 axially and thereby prevent wobbling of the first bearing 10. The stopper portions 335 are formed at a forward end of the annular cylindrical portion 330 and circumferentially spaced away from one another to support thereon the bottom surface 316 of the holder 31 and prevent the holder 31 the first bearing 10 from falling off from the recess HS10 into the shaft accommodating portion HS2. In the first embodiment, an inner diameter of the annular cylindrical portion 330 is made slightly larger than an outer diameter of the circumferential wall 310 of the holder 31 so as to leave a radial clearance between the annular cylindrical portion 330 and the circumferential wall 310. Even though the resinous holder 31 and the metal cap 33 show a difference in linear expansion coefficient therebetween, such a difference in linear expansion coefficient can be absorbed by the radial clearance between the circumferential wall 310 and the annular cylindrical portion 330.

The backlash adjusting mechanism 30 is assembled by fitting the resilient element 32 on the holder 31, fitting the first bearing 10 in the bearing retaining portion 315 of the holder 31, fitting the O-ring 34 in the ring groove 311 of the holder 31, attaching the metal cap 33 and bending the stopper portions 335 of the metal cap 33 to fix the holder 33 in position. Then, the power steering apparatus is completed by press-fitting the assembled backlash adjusting mechanism 30 in the recess HS10 of the gear housing HS and inserting the worm shaft WS through the first bearing 10. In this assembled state, there is a radial space left between the outer circumferential surface 10b of the first bearing 10 and the inner circumferential surface 315a, 315b of the bearing retaining portion 315 of the holder 31 so that the first bearing 10 can slide radially in the direction that increases and decrease a distance between the axis of the worm shaft WS and the axis of the worm wheel WW.

As explained above, the resilient element 32 is so structured as to become deformed to a larger diameter when the first bearing 10 slides in the direction that move the worm shaft WS away from the worm wheel WW and keep biasing the first bearing 10 in the direction that urges the worm shaft WS toward the worm wheel WW.

With the increase in temperature, the worm wheel WW (resinous gear teeth) expands to exert a force on the worm shaft WS (and the first bearing 10) in the direction that increases the distance between the axis of the worm shaft WS and the axis of the worm wheel WW. At this time, the backlash adjusting mechanism 30 allows the first bearing 10 to slide against the biasing force of the resilient element 32 in the direction that moves the worm shaft WS away from the worm wheel WW to thereby increase the distance between the axis of the worm shaft WS and the axis of the worm wheel WW. The first bearing 10 is slidable until the resilient element 32 is deformed to a maximum diameter position at which the outer circumferential surface 10b of the first bearing 10 comes into contact with the inner circumferential surface 315a of the holder 31 (the center of the first bearing 10 reaches the maximum shift position Omax) as shown in FIGS. 3 and 4. The backlash adjusting mechanism 30 is thus capable of adjusting the backlash between the worm shaft WS and the worm wheel WW while avoiding a sudden rise in friction caused by the temperature increase.

With the decrease in temperature, by contrast, the worm wheel WW contracts. The backlash adjusting mechanism 30 allows the first bearing 10 to slide under the biasing force of the resilient element 32 in the direction that moves the worm shaft WS toward the worm gear WW to thereby decrease the distance between the axis of the worm shaft WS and the axis of the worm wheel WW by an amount corresponding to the contraction of the worm wheel WW. The first bearing 10 is slidable until the outer circumferential surface 10b of the first bearing 10 comes into contact with the inner circumferential surface 315b of the holder 31 (the center of the first bearing 10 reaches the initial position Omin). The backlash adjusting mechanism 30 is thus capable of adjusting the backlash between the worm shaft WS and the worm wheel WW regardless of the temperature decrease.

Even when the worm gear WG (worm shaft WS and worm wheel WW) becomes worn during use, the backlash adjusting mechanism 30 allows the first bearing 10 to slide under the biasing force of the resilient element 32 in the same manner as above so as to decrease the distance between the axis of the worm shaft WS and the axis of the worm wheel WW by an amount corresponding to the wearing of the worm gear WG and thereby adjust the backlash between the worm shaft WS and the worm wheel WW.

If there occur a force of radial component in the gear engagement of the worm gear WG, this radial component force acts in the direction that moves the worm shaft WS away from the worm wheel WW so that the first bearing 10 slides until the outer circumferential surface 10b of the first bearing 10 comes into contact with the inner circumferential surface 315c of the holder 31. In this case, however, the engagement of the worm gear WG will not be affected since the amount of adjustment of the backlash is very small. The worm gear WG thus maintains smooth gear engagement.

The effects of the first embodiment are summarized as follows.

(1) The resilient element 32 exerts its resilient biasing force by the deformation of the body portion 320 to a larger diameter. The spring constant of the resilient element 32 can be thus set to a smaller degree through the effective use of the wire length of the resilient element 32. It is accordingly possible to limit a change in biasing force of the resilient element 32, or equivalently, a load variation caused by the backlash adjusting mechanism 30 with respect to the sliding movement of the first bearing 10 (i.e. the displacement of the worm shaft WS) and thereby possible to obtain improvement in steering feeling. It is also possible to attain a reduction in apparatus size as the resilient force can be exerted without axial stroke.

(2) The holder 31 is made of the resin material. It is thus possible to reduce noise caused by collision between the first bearing 10 and the holder 31. The holder 31 can be easily formed into a complicated shape by molding the resin material. This leads to improved molding efficiency (production efficiency) of the holder 31. Further, the cap 33 is made of the metal material and put on the holder 31. It is thus possible to, even when the holder 31 is made of the resin material, protect the holder 31 from deformation caused by any load on the holder 31 and improve the durability of the holder 31.

(3) The metal cap 33 is press fitted in the recess HS10 of the shaft accommodating portion 1182 of the gear housing HS. This enables easy fixing of the metal cap 33 and, by extension, the backlash adjusting mechanism 30 to the gear housing GH.

(4) The inner circumferential surface of the cap fitting recess HS is substantially circular in cross section. There is no need to form a step or steps on the circumferential surface of the recess HS10, i.e., no need to form the recess HS into a such complicated shape that a part of the circumferential surface of the recess HS increases in diameter as in the earlier technology. This leads to improved molding efficiency (production efficiency) of the gear housing HS.

(5) The stopper portions 335 are formed on the metal cap 33 to support thereon the holder 31 and prevent the holder 31 from falling off from the recess HS10 into the shaft accommodating portion HS2. The first bearing 10 can be thus fixed in position by the holder 31 in the recess HS10 so as not to fall off into the shaft accommodating portion HS2. There is no need to process the shaft accommodating portion HS2 into such a shape as to prevent the holder 31 and the first bearing 10 from falling off into the shaft accommodating portion HS2. This also leads to improved molding efficiency (production efficiency) of the gear housing GH.

(6) There is a radial clearance left between the outer circumferential surface of the holder 31 (the circumferential wall 310) and the inner circumferential surface of the metal cap 33 (the annular cylindrical portion 330). It is possible absorb a difference in linear expansion coefficient between the holder 31 and the metal cap 33 by such a radial clearance.

(7) The O-ring 34 is disposed between the outer circumferential surface of the holder 31 and the inner circumferential surface of the metal cap 33. It is thus possible to prevent rattling of the holder 31 within the metal cap 33.

(8) The resilient element 32 is prevented from rotating excessively about the axis of the worm shaft WS by contact of the second end portion 321 of the resilient element 32 with the rotation restriction surface 312a of the holder 31. It is thus possible to regulate the rotational position of the resilient element 32 relative to the holder 31 and prevent change in spring characteristics of the resilient element 32 caused by the relative rotation of the resilient element 32 and the holder 31.

(9) The second end portion 321 of the resilient element 32, which comes into contact with the rotation restriction surface 312a of the holder 31, extends in the direction parallel to the axis direction of the worm shaft WS. This leads to a radial size reduction of the resilient element 32.

(10) The resilient element 32 and the first bearing 10 axially overlap in position with each other. This axially overlapping arrangement leads to a reduction in axial size of the power steering apparatus. Further, the resilient element 32 (body portion 320) is in direct contact with the outer circumferential surface 10b of the first bearing 10. This leads to a reduction in radial dimension or size of the backlash adjusting mechanism 30.

(11) The radial cross-sectional dimension of the bearing retaining portion 315 (the thickness of the circumferential wall 310) is made larger than the radial cross-sectional dimension of the resilient element retaining portion (the thicknesses of the first and second guide portions 313 and 314). When the first bearing 310 slides under a load from the worm shaft WS, the load is exerted on the inner circumferential surface of the circumferential wall 310 upon contact of the first bearing 310 with the inner circumferential surface of the circumferential wall 310. It is thus possible that the bearing retaining portion 315 can secure sufficient strength against such a load through the effective use of the radial cross-sectional dimension.

(12) The retaining groove 314c is formed in the inner circumferential surface of the holder 31. Further, the through hole 314b is formed radially through the holder 31 from the retaining groove 314c to the outer circumferential surface of the holder 31 so as to function as a die cut hole for the formation of the retaining groove 314c during the process of molding the holder 31. This leads to improved molding efficiency (production efficiency) of the holder 31.

(13) The inner circumferential surface 315a of the bearing retaining portion 315 of the holder 31, which is located opposite from the worm wheel WW with respect to the axis of the worm shaft WS, has a smaller curvature radius than that of the outer circumferential surface 10b of the first bearing 10. This makes it possible to prevent the first bearing 10 from fitting in the curvature of the inner circumferential surface 315a of the bearing retaining portion 315 and secure stable sliding of the first bearing 10.

Second Embodiment

Figure 7:
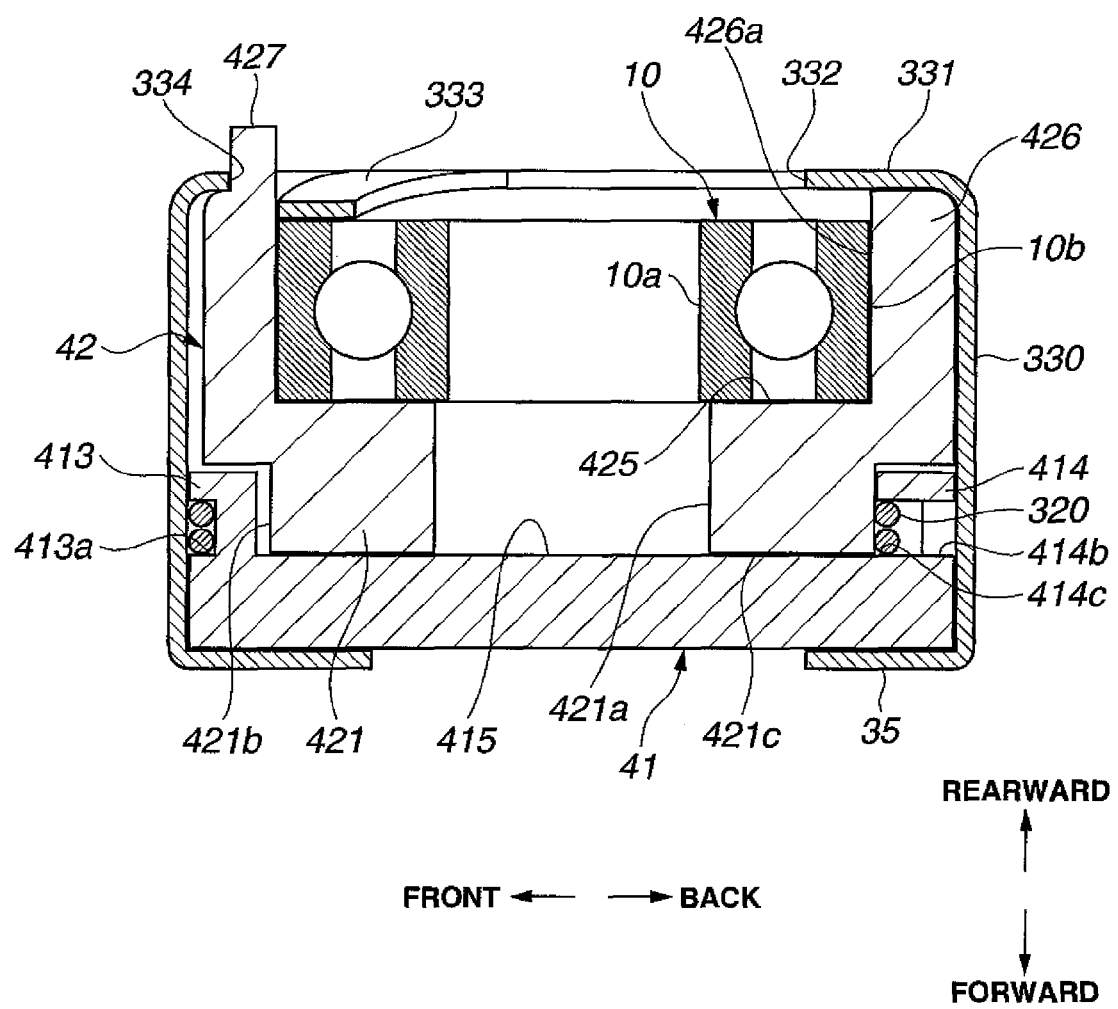
FIG. 7 is a section view of a backlash adjusting mechanism of a power steering apparatus according to a second embodiment of the present invention.

A power steering apparatus of the second embodiment is structurally similar to that of the first embodiment, except that the backlash adjusting mechanism 30 has a holder assembled with two separate holder members 41 and 42 as shown in FIG. 7.

The first holder member 41 includes a seat accommodating portion 415 to accommodate therein a cylindrical seat portion 421 of the second holder member 42. The seat accommodating portion 415 corresponds to the bearing retaining portion 315 and thus has a shape similar to that of the bearing retaining portion 315 shown in FIG. 6. The first holder member 41 also includes front guide portions 413 and 414 formed at and along front and back sides of the seat accommodating portion 415. Retaining grooves 413a and 414c are formed in an outer circumferential surface of the front guide portion 413 and an inner circumferential surface of the back guide portion 414, respectively, so as to retain therein the resilient element 32. Further, a through hole 414b is formed radially through the first guide portion 414 from the retaining groove 414c to the outer circumferential surface of the holder member 41 in the same manner as in the first embodiment.

The second holder member 42 includes a cylindrical bearing retaining portion 426 located coaxially on a bottom (rearward) side of the seat portion 421 to accommodate therein the first bearing 10. The seat portion 421 has an opening 421a larger in diameter than the inner circumferential surface 10a of the first bearing 10. On the other hand, the bearing retaining portion 426 has an inner circumferential surface 426a that is substantially the same in diameter than the outer circumferential surface 10b of the first bearing 10. There is thus a step 425 defined between the opening 421a and the inner circumferential surface 426a so that a forward side of the first bearing 10 is retained on the step 425 with a rearward side of the first bearing 10 urged by the plate spring portions 333 of the metal cap 33 to prevent axial movement of the first bearing 10. The second holder member 42 further includes an axially outwardly extending protrusion 427 formed on a front rearward side of the bearing retaining portion 426 so as to function as a stopper that prevents relative rotation of the holder and the metal cap.

The resilient element 32 (body portion 320) is retained in the first holder member 41 (the retaining grooves 414c and 413a), whereas the first bearing 10 is retained in the second holder member 42. In other words, the resilient element 32 (body portion 320) does not axially overlap in position with the first bearing 10 and thus does not come into direct contact with the outer circumferential surface 10b of the first bearing 10 but comes into contact with the outer circumferential surface 421b of the seat portion 421 of the second holder member 42 to bias the first bearing 10 through the second holder member 42 in the direction that urges the worm shaft WS toward the worm wheel WW.

As explained above, the resilient element 32 (body portion 320) does not axially overlap the first bearing 10 and thus bias the first bearing 10 through the holder in the second embodiment although the resilient element 32 (body portion 320) and the first bearing 10 axially overlap each other and directly bias the first bearing 10 in the first embodiment. It is however possible in the second embodiment to obtain the same effects as in the first embodiment.

Third Embodiment

A power steering apparatus of the third embodiment is structurally similar to that of the first embodiment, except that the backlash adjusting mechanism 30 has a holder 51 and a resilient element 52 to exert its resilient biasing force by deformation to a smaller diameter, rather than to a larger diameter, as shown in FIGS. 8A to 8D.

Figure 8A:
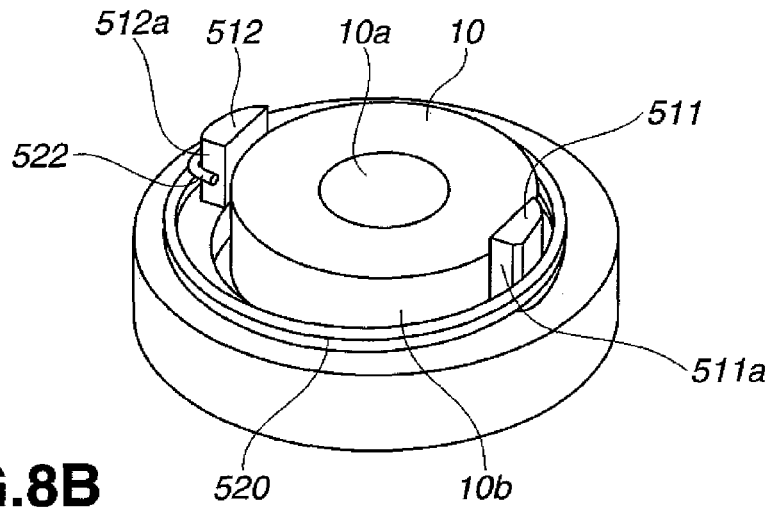
FIGS. 8A to 8D are a perspective view, a side view, a top view, and a front elevation view of a holder and a resilient element of a backlash adjusting mechanism of a power steering apparatus according to a third embodiment of the present invention, respectively.
Figures 8B, 8C:
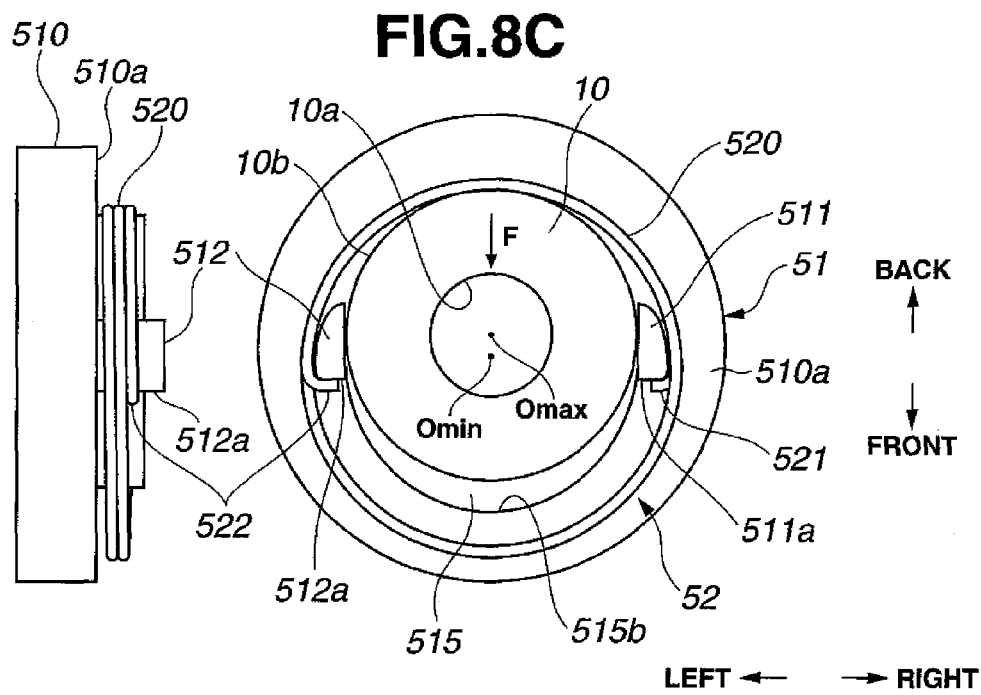
Figure 8D:
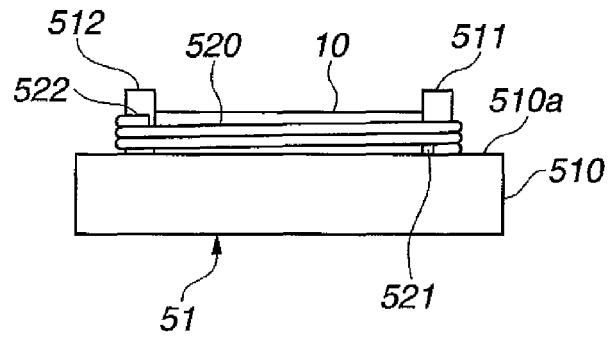

The holder 51 is made of a resin material and includes a disc-shaped base portion 510 and a bearing retaining portion 515 formed in a top (rearward) surface 510a of the base portion 510 to accommodate the first bearing 10 slidably with a part of the first bearing 10 protruding from the bearing retaining portion 515. As shown in FIGS. 8A and 8C, the bearing retaining portion 515 is defined to have an elongated (elliptic) recess hole so that the first bearing 10 can slide in a major axis direction of the bearing retaining portion 515.

Axially outwardly extending right and left protrusions 511 and 512 are formed on the top surface 510a of the base portion 510 at opposite sides of the bearing retaining portion 515 in a miner axis direction. These protrusions 511 and 512 have respective engagement surfaces 511a and 512a facing and directed toward a front inner circumferential surface 515b of the bearing retaining portion 515.

The resilient element 52 is placed on the top surface 510a of the base portion 510 of the holder 51 and includes a body portion 520 made of a resilient material and formed with a curvature to have an annular shape or an arc shape and first and second end portions 521 and 522 formed at opposite ends of the body portion 520. More specifically, the body portion 520 is formed into an annular coil spring and is so located as to axially overlap in position with the first bearing 10 and thereby face the outer circumferential surface of the first bearing 10. The first and second end portions 521 and 522 are bent radially inwardly and engaged with the engagement surfaces 511a and 522a of the protrusions 511 and 512, respectively. Thus, the resilient element 52 allows deformation of the body portion 520 but restricts relative displacement of the first and second end portions 521 and 522 by engagement of the first and second end portions 521 and 522 with the engagement surfaces 511a and 512a of the protrusions 511 and 512.

In this state, the first bearing 10 is accommodated in the bearing retaining portion 515 of the holder 51 so that the resilient element 52 (body portion 520) biases the first bearing 10 to bring the outer circumferential surface 10b of the first bearing 10 into contact with the front inner circumferential surface 515b of the bearing retaining portion 515. When a backward force is applied to the first bearing 10, the first bearing 10 slides backwardly against the biasing force of the resilient element 52. At this time, the body portion 520 becomes deformed to a smaller diameter as the first and second end portions 521 and 522 are restricted in position.

In this way, the resilient member 52 exerts its resilient biasing force on the first bearing 10 with the diameter-decreasing (radially inward) of the body portion 520. The spring constant of the resilient element 52 can be thus set to a smaller degree through the effective use of the wire length of the resilient element 52. It is accordingly possible to limit a change in biasing force of the resilient element 52, or equivalently, a load variation caused by the backlash adjusting mechanism 30 with respect to the sliding movement of the first bearing 10 (i.e. the displacement of the worm shaft WS) and thereby possible to obtain improvement in steering feeling. It is also possible to attain a reduction in apparatus size as the resilient biasing force can be exerted without axial stroke.

As the holder 51 is made of the resin material, it is thus possible to reduce noise caused by collision between the first bearing 10 and the holder 51. Further, the holder 51 can be easily formed into a complicated shape by molding the resin material. This leads to improved molding efficiency (production efficiency) of the holder 51. As the metal cap 33 is put on the holder 51, it is possible to protect the holder 51 from deformation caused by any load on the holder 51 and improve the durability of the holder 51. The metal cap 33 is press-fitted in the recess HS10 of the shaft accommodating portion HS2 of the gear housing HS. This enables easy fixing of the metal cap 33 and, by extension, the backlash adjusting mechanism 30 to the gear housing GH.

Furthermore, the inner circumferential surface of the cap fitting recess HS is substantially circular in cross section. There is no need to form a step or steps on the circumferential surface of the recess HS10, i.e., no need to form the recess HS into a such complicated shape that a part of the circumferential surface of the recess HS increases in diameter as in the earlier technology. This leads to improved molding efficiency (production efficiency) of the gear housing HS.

The entire contents of Japanese Patent Application No. 2009-072257 (filed on Mar. 24, 2009) are herein incorporated by reference.

Although the present invention has been described with reference to the above-specific embodiments of the invention, the invention is not limited to these exemplary embodiments. Various modification and variation of the embodiments described above will occur to those skilled in the art in light of the above teachings.

The backlash adjusting mechanism 30 may adopt any means, other than the O-ring 34, to prevent rattling of the holder 31 within the metal cap 33. For example, it is conceivable to form a hook(s), lug(s) etc. on the metal cap 33 as the holder rattling prevention means. It is alternatively conceivable to form a protrusion(s) on the outer circumferential surface of the holder 31, without disposing the O-ring (and forming the O-ring fitting groove), to prevent rattling of the holder 31 by contact of the protrusion(s) with the inner circumferential surface of the metal cap 33.

The backlash adjusting mechanism 30 utilizes the coil spring as the resilient element 32, 52 in the first to third embodiments as explained above. The number of turns of the coil spring can be adjusted as appropriate as long as the body portion 320, 520 of the resilient element 32, 52 has a curvature. For example, the coil spring can alternatively be made from only a half turn of spring steel wire and thus formed into an arc shape. Further, the form of the coil spring is not particularly limited. It is conceivable to form a ring-shaped spring element by connecting opposite ends of coil springs (of such small diameter that the coil springs can be fitted in the retaining grooves 314c and 313a or 414c and 413a) and wind the ring-shaped spring element in the retaining grooves 314c and 313a or 414c and 413a. The backlash adjusting mechanism 30 may utilize any other resilient element such as rubber O-ring in place of the coil spring.

The metal cap 33 may alternatively be formed into an arc shape although the metal cap 33 is annular cylindrical in shape in the first embodiment as explained above. The form of the metal cap 33 is not particularly limited as long as the metal cap 33 can be disposed between the holder 31 and the recess HS10 to cover therewith the first bearing 10, the holder 31 and the resilient element 32.

The scope of the invention is defined with reference to the following claims.

What is claimed is:

1. A power steering apparatus, comprising:
a steering mechanism having a steering shaft connected to a steering wheel to steer steerable wheels in response to a steering operation of the steering wheel;
a worm wheel mounted on the steering shaft;
a worm shaft engaged with the worm wheel;
an electric motor connected to one end of the worm shaft to apply a steering force to the steering mechanism via the worm wheel and the worm shaft;
a gear housing having a wheel accommodating portion to accommodate therein the worm wheel and a shaft accommodating portion to accommodate therein the worm shaft;
a bearing disposed in the shaft accommodating portion and mounted on the other end of the worm shaft to rotatably support the worm shaft;
a holder disposed in the shaft accommodating portion and having a bearing retaining portion to retain therein the bearing; and
a resilient element disposed in the shaft accommodating portion and having a body portion made of a resilient material and formed with a curvature and first and second end portions formed at opposite ends of the body portion, the body portion being so structured as to become deformed to a larger diameter when the bearing shifts in a direction that moves the worm shaft away from the worm wheel and bias the bearing in a direction that urges the worm wheel toward the worm wheel,
wherein the resilient element is a coil spring; and
wherein the first end portion of the resilient element is configured as a free unfixed end portion so as to allow the body portion to become deformed to the larger diameter by displacement of the first end portion relative to the second end portion.

2. The power steering apparatus according to claim 1, wherein the holder is made of a resin material; and wherein the power steering apparatus further comprises a metal cap formed with a curvature and disposed between the holder and the shaft accommodating portion.

3. The power steering apparatus according to claim 2, wherein the metal cap is press-fitted in a part of the shaft accommodating portion.

4. The power steering apparatus according to claim 3, wherein an inner circumferential surface of the part of the shaft accommodating portion in which the metal cap is press-fitted is substantially circular in cross section.

5. A power steering apparatus comprising:
a steering mechanism having a steering shaft connected to a steering wheel to steer steerable wheels in response to a steering operation of the steering wheel;
a worm wheel mounted on the steering shaft;
a worm shaft engaged with the worm wheel;
an electric motor connected to one end of the worm shaft to apply a steering force to the steering mechanism via the worm wheel and the worm shaft;
a gear housing having a wheel accommodating portion to accommodate therein the worm wheel and a shaft accommodating portion to accommodate therein the worm shaft;
a bearing disposed in the shaft accommodating portion and mounted on the other end of the worm shaft to rotatably support the worm shaft;
a holder disposed in the shaft accommodating portion and having a bearing retaining portion to retain therein the bearing; and
a resilient element disposed in the shaft accommodating portion and having a body portion made of a resilient material and formed with a curvature and first and second end portions located at opposite ends of the body portion, the body portion being located at a position axially overlapping the bearing and so structured as to become deformed in such a manner as to increase or decrease in diameter when the bearing shifts in a direction that moves the worm shaft away from the worm wheel and bias the bearing in a direction that urges the worm wheel toward the worm wheel,
wherein the holder is made of a resin material; and
wherein the power steering apparatus further comprises a metal cap formed with a curvature and disposed between the holder and the shaft accommodating portion.

6. The power steering apparatus according to claim 5, wherein the metal cap is press-fitted in a part of the shaft accommodating portion.

7. The power steering apparatus according to claim 6, wherein an inner circumferential surface of the part of the shaft accommodating portion in which the metal cap is press-fitted is substantially circular in cross section.

8. The power steering apparatus according to claim 5, wherein the metal cap has a stopper portion to hold the holder in position within the shaft accommodating portion.

9. The power steering apparatus according to claim 5, wherein there is a radial clearance between an outer circumferential surface of the holder and an inner circumferential surface of the metal cap.

10. The power steering apparatus according to claim 9, further comprising an O-ring between the outer circumferential surface of the holder and the inner circumferential surface of the metal cap.

11. A power steering apparatus comprising:
a steering mechanism having a steering shaft connected to a steering wheel to steer steerable wheels in response to a steering operation of the steering wheel;
a worm wheel mounted on the steering shaft;
a worm shaft engaged with the worm wheel;
an electric motor connected to one end of the worm shaft to apply a steering force to the steering mechanism via the worm wheel and the worm shaft;
a gear housing having a wheel accommodating portion to accommodate therein the worm wheel and a shaft accommodating portion to accommodate therein the worm shaft;

a bearing disposed in the shaft accommodating portion and mounted on the other end of the worm shaft to rotatably support the worm shaft;

a holder disposed in the shaft accommodating portion and having a bearing retaining portion to retain therein the bearing; and a resilient element disposed in the shaft accommodating portion and having a body portion made of a resilient material and formed with a curvature and first and second end portions located at opposite ends of the body portion, the body portion being located at a position axially overlapping the bearing and so structured as to become deformed in such a manner as to increase or decrease in diameter when the bearing shifts in a direction that moves the worm shaft away from the worm wheel and bias the bearing in a direction that urges the worm wheel toward the worm wheel, wherein the holder has a rotation restriction surface to prevent excessive relative rotation of the resilient element relative to the holder by contact of the second end portion of the resilient element with the rotation restriction surface.

12. The power steering apparatus according to claim 11, wherein the second end portion of the resilient element is bent to extend in a direction parallel to an axis of the worm shaft.

13. A power steering apparatus comprising:

a steering mechanism having a steering shaft connected to a steering wheel to steer steerable wheels in response to a steering operation of the steering wheel;

a worm wheel mounted on the steering shaft;

a worm shaft engaged with the worm wheel;

an electric motor connected to one end of the worm shaft to apply a steering force to the steering mechanism via the worm wheel and the worm shaft;

a gear housing having a wheel accommodating portion to accommodate therein the worm wheel and a shaft accommodating portion to accommodate therein the worm shaft;

a bearing disposed in the shaft accommodating portion and mounted on the other end of the worm shaft to rotatably support the worm shaft;

a holder disposed in the shaft accommodating portion and having a bearing retaining portion to retain therein the bearing; and a resilient element disposed in the shaft accommodating portion and having a body portion made of a resilient material and formed with a curvature and first and second end portions located at opposite ends of the body portion, the body portion being located at a position axially overlapping the bearing and so structured as to become deformed in such a manner as to increase or decrease in diameter when the bearing shifts in a direction that moves the worm shaft away from the worm wheel and bias the bearing in a direction that urges the worm wheel toward the worm wheel, wherein the holder has a resilient element retaining portion to retain therein the resilient element; and wherein the bearing retaining portion is axially offset from the resilient element retaining portion and has a radial cross-sectional dimension larger than that of the resilient element retaining portion.

14. The power steering apparatus according to claim 13, wherein the resilient element retaining portion has a retaining groove formed in an inner circumferential surface of the holder to retain the resilient element and a through hole formed radially to extend from the retaining groove to an outer circumferential surface of the holder.

15. A power steering apparatus comprising:

a steering mechanism having a steering shaft connected to a steering wheel to steer steerable wheels in response to a steering operation of the steering wheel;

a worm wheel mounted on the steering shaft;

a worm shaft engaged with the worm wheel;

an electric motor connected to one end of the worm shaft to apply a steering force to the steering mechanism via the worm wheel and the worm shaft;

a gear housing having a wheel accommodating portion to accommodate therein the worm wheel and a shaft accommodating portion to accommodate therein the worm shaft;

a bearing disposed in the shaft accommodating portion and mounted on the other end of the worm shaft to rotatably support the worm shaft;

a holder disposed in the shaft accommodating portion and having a bearing retaining portion to retain therein the bearing; and a resilient element disposed in the shaft accommodating portion and having a body portion made of a resilient material and formed with a curvature and first and second end portions located at opposite ends of the body portion, the body portion being located at a position axially overlapping the bearing and so structured as to become deformed in such a manner as to increase or decrease in diameter when the bearing shifts in a direction that moves the worm shaft away from the worm wheel and bias the bearing in a direction that urges the worm wheel toward the worm wheel, wherein an inner circumferential surface of the holder located opposite from the worm wheel has a curvature radius smaller than that of an outer circumferential surface of the bearing.

* * * * *